US012646851B2

(12) United States Patent
Lee et al.

(10) Patent No.: US 12,646,851 B2
(45) Date of Patent: Jun. 2, 2026

(54) RADAR FOR VEHICLE AND VEHICLE INCLUDING THE SAME

(71) Applicant: HL KLEMOVE CORP., Incheon (KR)

(72) Inventors: Hyunseok Lee, Incheon (KR); Sungjoon Heo, Incheon (KR)

(73) Assignee: HL KLEMOVE CORP., Incheon (KR)

( * ) Notice: Subject to any disclaimer, the term of this patent is extended or adjusted under 35 U.S.C. 154(b) by 93 days.

(21) Appl. No.: 18/613,011

(22) Filed: Mar. 21, 2024

(65) Prior Publication Data

US 2024/0322442 A1 Sep. 26, 2024

(30) Foreign Application Priority Data

Mar. 21, 2023 (KR) ........................ 10-2023-0036565

(51) Int. Cl.
H01Q 13/18 (2006.01)
B60W 30/14 (2006.01)
(Continued)

(52) U.S. Cl.
CPC .......... H01Q 13/18 (2013.01); B60W 30/143 (2013.01); B60W 30/16 (2013.01); B60W 50/029 (2013.01); H01Q 1/32 (2013.01); H01Q 1/38 (2013.01); H01Q 1/48 (2013.01); H01Q 13/0233 (2013.01); B60W 2420/408 (2024.01); B60W 2554/802 (2020.02)

(58) Field of Classification Search
CPC ..... B60W 2420/408; B60W 2554/802; B60W 30/143; B60W 30/16; B60W 50/029; G01S 13/931; G01S 7/03; H01Q 1/32;

H01Q 1/3233; H01Q 1/38; H01Q 1/48; H01Q 13/0233; H01Q 13/18; H01Q 13/22; H01Q 21/005; H01Q 21/064
See application file for complete search history.

(56) References Cited

U.S. PATENT DOCUMENTS 8,003,503 B1 * 8/2011 Clark ................... H10D 64/665
                                                          438/522
10,992,059 B2 * 4/2021 Zhu ..................... H01Q 21/0006
(Continued)

FOREIGN PATENT DOCUMENTS

| JP | 2005-192172 | 7/2005 |
| KR | 10-2006-0099184 | 9/2006 |
| KR | 10-2237549 | 4/2021 |

OTHER PUBLICATIONS

Office Action dated Jan. 16, 2025 for Korean Patent Application No. 10-2023-0036565 and its English translation provided by Applicant's foreign counsel.

*Primary Examiner* — Thien M Le
(74) *Attorney, Agent, or Firm* — WOMBLE BOND DICKINSON (US) LLP

(57) ABSTRACT

A radar for a vehicle may include a frame having a waveguide antenna embedded therein and extending in a direction crossing an extension direction of the waveguide antenna, a plated region covering at least a portion of the outer peripheral surface of the frame and formed of a metallic material, and an un-plated region not coated with the metallic material on one surface of the frame, wherein the un-plated region is located to be adjacent to the waveguide antenna. Therefore, the radar for the vehicle can improve the stability of an antenna pattern and a phase.

19 Claims, 8 Drawing Sheets

(51) Int. Cl.

| | |
|---|---|
| *B60W 30/16* | (2020.01) |
| *B60W 50/029* | (2012.01) |
| *H01Q 1/32* | (2006.01) |
| *H01Q 1/38* | (2006.01) |
| *H01Q 1/48* | (2006.01) |
| *H01Q 13/02* | (2006.01) |

(56) References Cited

U.S. PATENT DOCUMENTS

| | | | | |
|---|---|---|---|---|
| 11,658,135 B2 * | 5/2023 | Seler | .................... | G01S 13/08 |
| | | | | 342/175 |
| 2007/0099398 A1 * | 5/2007 | Sugawara | ........ | H01L 21/31111 |
| | | | | 257/E21.292 |
| 2007/0099435 A1 * | 5/2007 | Sugawara | ............... | C23C 8/36 |
| | | | | 438/770 |
| 2007/0229366 A1 * | 10/2007 | Kim | ........................ | H01Q 9/42 |
| | | | | 343/846 |
| 2018/0253002 A1 * | 9/2018 | Shi | ........................ | G03F 7/0005 |
| 2019/0238375 A1 * | 8/2019 | Bowen | .................... | H01Q 3/44 |
| 2020/0381834 A1 * | 12/2020 | Tian | .................... | H01Q 9/0421 |
| 2020/0395667 A1 * | 12/2020 | Rogers | .................... | H01Q 1/38 |
| 2021/0349206 A1 * | 11/2021 | Kim | ........................ | H01Q 13/22 |

* cited by examiner

1

1

30    20    40    30    20    20    30

RADAR FOR VEHICLE AND VEHICLE INCLUDING THE SAME

CROSS-REFERENCE TO RELATED APPLICATION

This application claims priority to and the benefit of Korean Patent Application No. 10-2023-0036565, filed on Mar. 21, 2023, the disclosure of which is incorporated herein by reference in its entirety.

TECHNICAL FIELD

The present disclosure generally relates to a radar (radio detection and ranging) for a vehicle and a vehicle including the same, and more specifically to a radar for a vehicle and a vehicle including the same which can improve the stability of an antenna pattern and a phase.

RELATED ART

Radar may refer to a wireless monitoring device that detects a distance, direction, altitude and the like of an object by emitting electromagnetic waves to an object and receiving electromagnetic waves reflected from the object.

A typical radar includes an antenna for emitting and receiving electromagnetic waves. The antenna may refer to a conversion device for emitting or receiving radio waves in space in order to achieve the purpose of wireless communication.

There are various types of antennas according to their structures and principles. For example, a dual planar antenna is an antenna in which an opening for receiving radio waves is formed as a plane. And, planar antennas can be largely classified into microstrip antennas and waveguide antennas.

The development of an antenna structure that is capable of improving the stability of an antenna pattern and phase while maintaining a ground may be needed.

RELATED ART DOCUMENTS

Patent Documents (Patent Document 1) Korean Patent No. 10-2237549 (issued on Apr. 1, 2021)
(Patent Document 2) Korean Patent Application Publication No. 10-2006-0099184 (published Sep. 19, 2009)

SUMMARY

An object of the present disclosure may be to provide a radar for a vehicle and a vehicle including the same improving the stability of an antenna pattern and phase. Another object of the present disclosure may be to provide a radar for a vehicle in which the size and shape of a ground can be easily adjusted, and a vehicle including the same.

Still another object of the present disclosure may be to provide a radar for a vehicle that can be applied to various structures of antennas, and a vehicle including the same.

The problems to be solved by the present disclosure is not limited to the problems mentioned above, and other problems that are not mentioned will be clearly understood by those skilled in the art from the description below.

In order to achieve the above objects, the radar for a vehicle according to an exemplary embodiment of the present disclosure includes a waveguide antenna a frame having the waveguide antenna embedded therein and extending in a direction crossing an extension direction of the waveguide antenna; and a plated region which surrounds at least a portion of the outer peripheral surface of the frame and is formed of a metallic material wherein an unplated region in which the metallic material is not disposed is formed on one surface of the frame, and wherein the unplated region is disposed to be adjacent to the waveguide antenna.

In addition, the shape and area of the unplated region may be formed such that a predetermined shape and area of a ground of the waveguide antenna correspond to the shape and area of the plated region, respectively.

In addition, the unplated region may have a length formed to be greater than or equal to a length of the waveguide antenna in the extension direction of the waveguide antenna.

In addition, the unplated region may have a width in the extension direction of the frame formed to be greater than or equal to a value obtained by dividing the wavelength of a wave passing through the waveguide antenna by half.

In addition, a plurality of the unplated regions that are spaced apart from each other may be formed on one surface of the frame.

In addition, the waveguide antenna may be located between two different unplated regions.

In addition, the unplated region which is disposed to be adjacent to one side of the waveguide antenna and the unplated region which is disposed to be adjacent to the other side of the waveguide antenna may be formed in shapes that are symmetrical to each other with respect to the waveguide antenna.

In addition, the plurality of unplated regions may be respectively formed in a slot shape and arranged side by side along the extension direction of the waveguide antenna.

In addition, the unplated region may be tapered at edges.

In addition, the frame may have a plurality of the waveguide antennas embedded therein.

In addition, the unplated region may be located between two different waveguide antennas.

In addition, the unplated region may be formed by alternately arranging a plurality of protrusions and a plurality of concave portions along the extension direction of the waveguide antenna.

In addition, the waveguide antenna may include a slot antenna.

In addition, the waveguide antenna may include a horn antenna.

In addition, the operating frequency of the waveguide antenna may be 76 GHz or more and 81 GHz or less.

In addition, the present disclosure provides a vehicle, including a radar for emitting an electromagnetic wave signal in at least one of front, rear, left and right directions of the vehicle and receiving the reflected electromagnetic wave signal; and a controller for deriving surrounding information of the vehicle based on the electromagnetic wave signal received by the radar, wherein the radar includes a waveguide antenna; a frame having the waveguide antenna embedded therein and extending in a direction crossing an extension direction of the waveguide antenna; and a plated region which surrounds at least a portion of the outer peripheral surface of the frame and is formed of a metallic material, wherein an unplated region, which is formed to be adjacent to the waveguide antenna and in which the metallic material is not disposed, is formed on one surface of the frame.

In addition, the unplated region may have a width in the extension direction of the frame formed to be greater than or equal to a value obtained by dividing the wavelength of a wave passing through the waveguide antenna by half.

In addition, the controller may maintain a constant driving speed of the vehicle based on surrounding information of the vehicle.

In addition, the controller may adjust a driving speed of the vehicle such that a distance between the vehicle and a vehicle preceding the vehicle is greater than a preset reference distance, based on surrounding information of the vehicle.

In addition, the controller may adjust a driving direction of the vehicle based on surrounding information of the vehicle, when a breakdown of the vehicle occurs.

Among the various effects of the present disclosure, effects that can be obtained through the above-described solution are as follows.

First of all, a radar for a vehicle may include a waveguide antenna and a frame in which the waveguide antenna is embedded. A plated region which is formed of a metallic material may be disposed on at least a portion of an outer peripheral surface of the frame. In this case, an un-plated region in which no metallic material is disposed may be formed on one surface of the frame. In addition, the un-plated region may be disposed to be adjacent to the waveguide antenna.

Accordingly, by providing the un-plated region, the total volume of a ground can be reduced. Accordingly, the stability of the antenna pattern and phase can be improved.

In addition, the shape and area of the un-plated region are formed such that a shape and area of the ground of the waveguide antenna correspond to the shape and area of the plated region.

Accordingly, the size and shape of the ground can be adjusted by changing the shape and area of the un-plated region. As a result, the effect of stabilizing the pattern and phase can be improved by adjusting the antenna pattern.

In addition, the un-plated region may be provided in various shapes and structures.

Therefore, it can be applied to various structures of antennas including a single antenna structure and an array antenna structure.

The effects of the present disclosure are not limited to the effects mentioned above, and other effects that are not mentioned will be clearly understood by those skilled in the art from the description below.

DETAILED DESCRIPTION OF EMBODIMENTS

Figure 1:
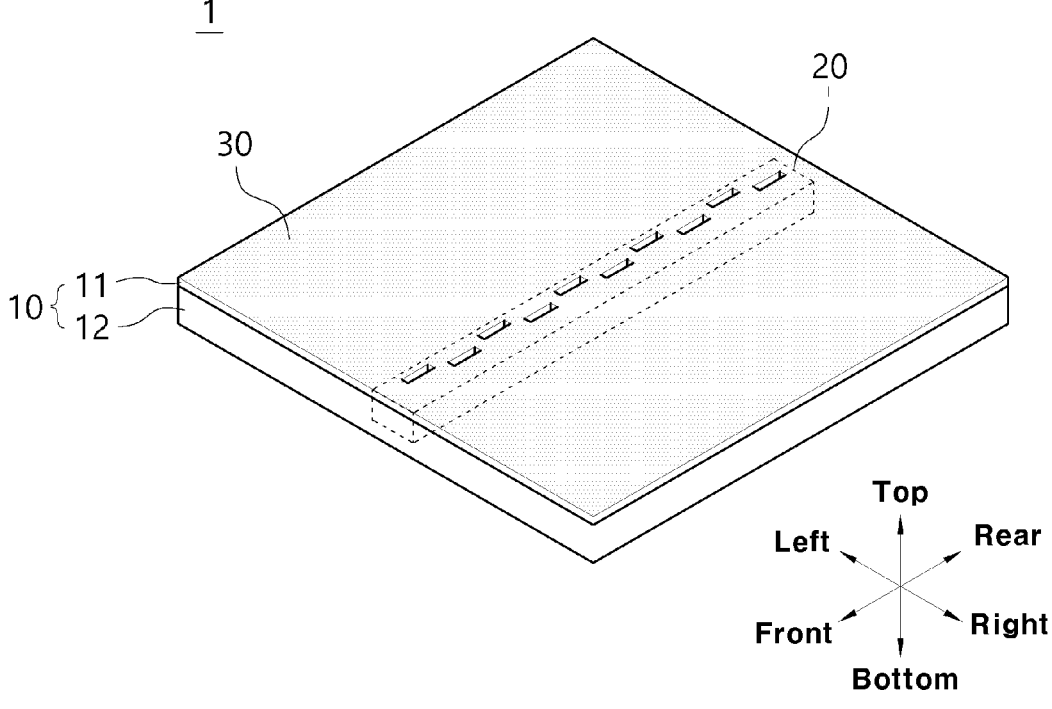
FIG. 1 is a perspective view for illustrating a radar for a vehicle.

Hereinafter, the radar for a vehicle 1 according to an exemplary embodiment of the present disclosure and a vehicle including the same will be described in more detail with reference to the drawings.

In the following description, the descriptions of some components may be omitted to clarify the characteristics of the present disclosure.

In the present specification, the same reference numerals are assigned to the same components even in different exemplary embodiments, and the overlapping descriptions thereof will be omitted.

The accompanying drawings are only for easy understanding of the exemplary embodiments disclosed in this specification, and the technical ideas disclosed in the present specification are not limited by the accompanying drawings.

Singular expressions include plural expressions unless the context clearly indicates otherwise.

The terms "top", "bottom", "left", "right", "front side" and "rear side" used in the following description will be understood with reference to coordinate planes illustrated in FIG. 1.

In the present disclosure, an antenna may mean a conversion device for emitting and/or receiving radio waves. There are various types of antennas according to the structures and principles thereof, and hereinafter, a waveguide antenna, which is a type of planar antenna, will be mainly described for illustration purposes only.

Figure 2:
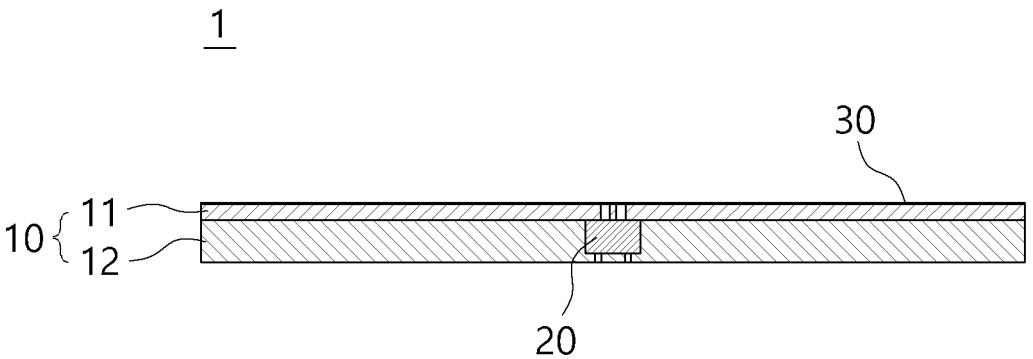
FIG. 2 is a front view for illustrating the radar of FIG. 1.

FIGS. 1 to 2 illustrate a radar 1 for a vehicle.

The radar 1 for the vehicle includes a frame 10, a waveguide antenna 20 and a plated region 30.

The frame 10 has a waveguide antenna 20 embedded therein, and the outer peripheral surface of the frame 10 is covered by a plated region 30.

The plated region 30 is formed of a metallic material to form a ground. For example, the plated region 30 may entirely cover an upper surface of the frame 10. Accordingly, the ground is formed from the waveguide antenna 20 to the left end and/or the right end of the frame 10, thereby generating a surface current and increasing the fluctuation of the antenna pattern. As a result, the stability of the antenna pattern and phase may deteriorate.

An object of some embodiments of the present disclosure may be to provide a radar for a vehicle is capable of solving the above problems.

Hereinafter, a radar for a vehicle and a vehicle including the same according to certain exemplary embodiments of the present disclosure will be described with reference to FIGS. 3 to 7.

First of all, with reference to FIGS. 3 to 5, a radar 1 for a vehicle according to an exemplary embodiment of the present disclosure and a vehicle including the same will be described.

The radar 1 for the vehicle may efficiently transmit or emit, and/or receive radio waves in space to achieve the purpose of wireless communication. In addition, the radio waves are converted for the transmission or emission, and/or reception of radio waves.

For example, the radar 1 for the vehicle may transmit or emit an electromagnetic wave signal in at least one of front, rear, and left and right directions of the vehicle, and receive the reflected electromagnetic wave signal.

In the radar 1 for the vehicle, the transmission pattern of an antenna is formed in a process of emitting, receiving or converting radio waves. The stability of the antenna pattern increases as the variation decreases.

The electromagnetic wave signal received by the radar 1 for the vehicle is transmitted to a controller or processor of the vehicle. The controller or processor derives the information regarding the surrounding of the vehicle based on the electromagnetic wave signal received by the radar 1.

In an exemplary embodiment of the present disclosure, the controller or processor may maintain a constant driving speed of the vehicle based on the information regarding the surrounding of the vehicle. In another exemplary embodiment of the present disclosure, the controller or processor may adjust a driving speed of the vehicle such that a distance between the host vehicle and another vehicle preceding the host vehicle is greater than a preset reference distance based on the information on the surrounding of the vehicle. In still another exemplary embodiment of the present disclosure, the controller may adjust a direction of driving the vehicle based on the information on the surrounding of the vehicle when the malfunction or abnormality of the vehicle occurs.

Figure 3:
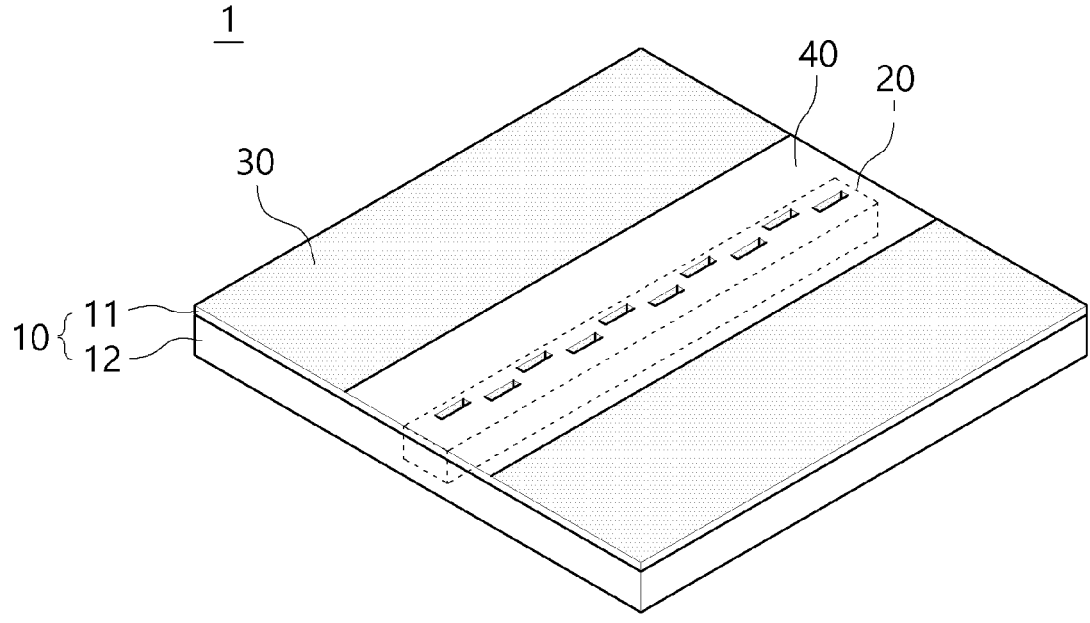
FIG. 3 is a perspective view for illustrating a radar for a vehicle according to an exemplary embodiment of the present disclosure.
Figure 4:
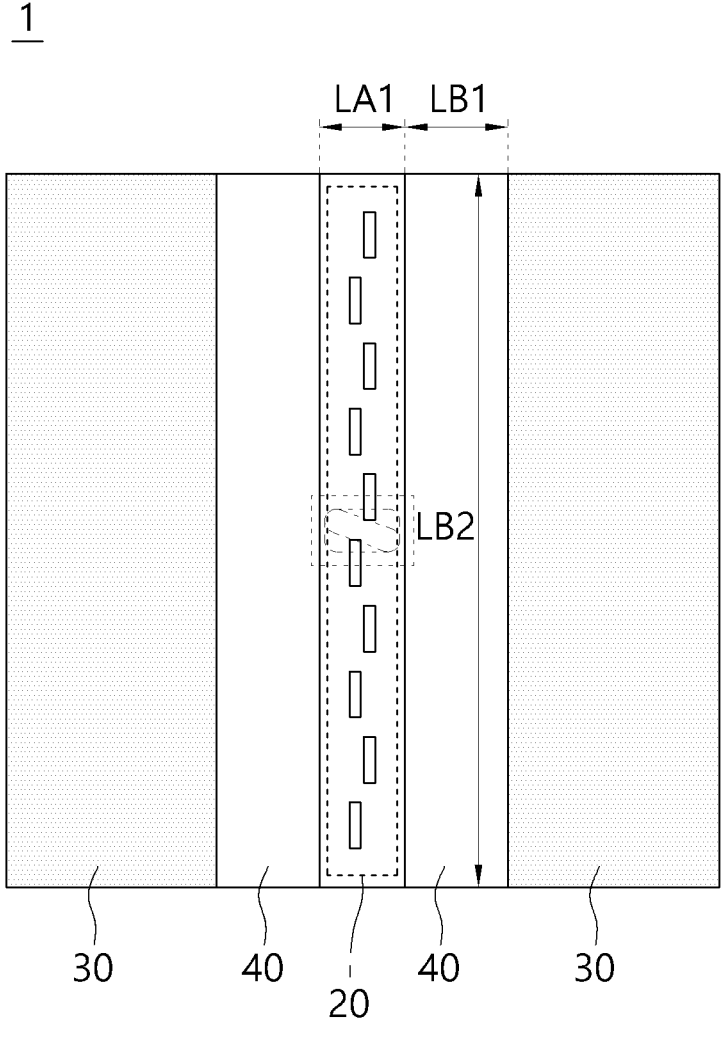
FIG. 4 is a plan view illustrating the radar of FIG. 3.
Figure 5:
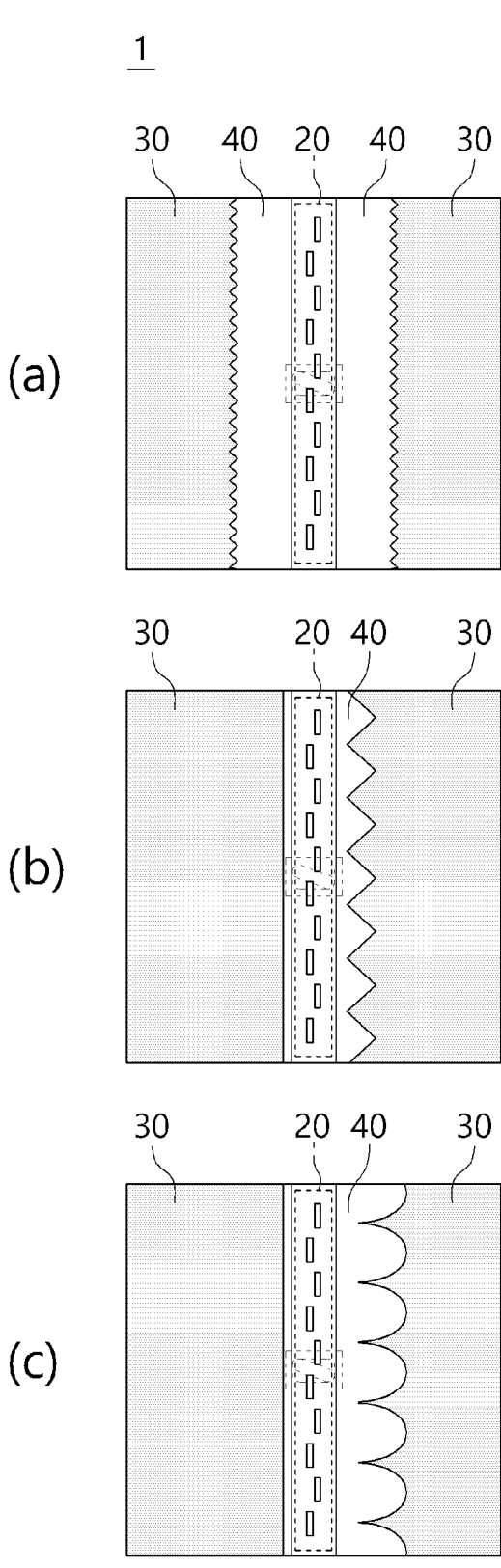
FIG. 5 is plan views illustrating a radar for a vehicle having an un-plated region according to exemplary embodiments of the present disclosure.

In the exemplary embodiment illustrated in FIGS. 3 to 5, the radar 1 for the vehicle may include a frame 10, a waveguide antenna 20, a plated region 30 and an un-plated region 40. Unlike the radar shown in FIGS. 1 and 2, the radar 1 for the vehicle 1 according an exemplary embodiment to the present disclosure illustrated in FIGS. 3 to 5 further includes the un-plated region 40.

The frame 10 forms the exterior of the radar 1 for the vehicle.

In an exemplary embodiment, the frame 10 may extend in a direction crossing a direction in which the waveguide antenna 20 is extended. For example, the frame 10 may have a rectangular plate shape extending in the left and right and front and rear directions, although not limited thereto.

The waveguide antenna 20 is embedded in the frame 10. To this end, it is preferable that the vertical height or thickness of the frame 10 is greater than the vertical height or thickness of the waveguide antenna 20, or the frame 10 is thicker than the waveguide antenna 20 to embed the waveguide antenna 20 therein.

In the exemplary embodiment illustrated in FIGS. 3 to 5, the frame 10 includes a first layer 11 and a second layer 12.

The first layer 11 and the second layer 12 form the upper and lower sides (or facades) of the frame 10, respectively. That is, the first layer 11 and the second layer 12 are arranged or stacked to overlap each other in the vertical direction.

For instance, the first layer 11 and the second layer 12 may be independently manufactured through an injection process and then bonded to each other.

The waveguide antenna 20 is disposed between the first layer 11 and the second layer 12 of the frame 10.

The waveguide antenna 20 is a part configured to transmit, receive and convert radio waves in the radar 1 for the vehicle.

For example, for improving the accuracy of measurement associated with a target and the ability to detect a desired target, the operating frequency of the waveguide antenna 20 may be 76 GHz or more and 81 GHz or less.

In addition, the waveguide antenna 20 may include, for example, but not limited to, a slot antenna or a horn antenna.

The waveguide antenna 20 is disposed in the inner space of the frame 10. For instance, the waveguide antenna 20 may be disposed to overlap the central point of the frame 10 in the vertical direction. The waveguide antenna 20 may be disposed between the bottom surface of the first layer 11 and the top surface of the second layer 12.

The plated region 30 is formed on the outer peripheral surface of the frame 10.

The plated region 30 may be configured to be a ground for the waveguide antenna 20.

The plated region 30 is disposed to cover at least a portion of the outer peripheral surface of the frame 10. In the exemplary embodiment illustrated in FIGS. 3 to 5, the plated region 30 is disposed on the left and right sides (e.g. left and right end portions) of the upper surface of the frame 10. In the present exemplary embodiment, the plated region 30 extends in the same direction as a direction in which the waveguide antenna 20 extends (e.g., a front-rear direction).

The plated region 30 may be formed of a metallic material in order to function as a ground.

The plated region 30 may have a plurality of regions spaced apart from each other. For example, the waveguide antenna 20 is disposed between two plated regions 30 that are adjacent to each other.

In addition, the un-plated region 40 may be formed between two adjacent plated regions 30.

The un-plated region 40 may be a region where no metallic material is disposed on one surface of the frame 10 on which the plated region 30 is disposed.

The un-plated region 40 is arranged to be adjacent to the waveguide antenna 20. The un-plated region 40 may be disposed on or above one side or both sides of the waveguide antenna 20. In the exemplary embodiment, the un-plated regions 40 are disposed on the left and right sides of the waveguide antenna 20, respectively.

The un-plated region 40 is located between two plated regions 30 that are spaced apart from each other. One surface of the frame 10 may be divided into one or more plated regions 30 and one or more un-plated regions 40.

As the un-plated region 40 is formed on one surface of the frame 10, the area of the plated region 30 is reduced in comparison with the radar illustrated in FIGS. 1 and 2. Accordingly, the overall volume or size of the ground by the plated region 30 may be also reduced. Additionally, the stability of the antenna pattern and phase may be improved. While maintaining the beam width of the antenna pattern, variation of the pattern may be reduced, and the phase may be more stabilized.

In the exemplary embodiment shown in FIGS. 3 to 5, the un-plated region 40 may extend in the same direction as a direction in which the waveguide antenna 20 extends. For instance, the un-plated region 40 extends in the front-back direction.

The un-plated region 40 may have a plurality of regions that are spaced apart from each other. The plurality of un-plated regions 40 that are spaced apart from each other may be formed on one surface of the frame 10. The areas and positions of the un-plated regions 40 that are spaced apart from each other are designed independently of each other.

In an exemplary embodiment, each of the plurality of un-plated regions 40 has one or more slots and the plurality of un-plated regions 40 may be arranged side by side along a direction in which the waveguide antenna 20 extends (e.g., a direction substantially parallel to the waveguide antenna 20). the edges of the un-plated region 40 may be tapered.

In addition, the waveguide antenna 20 is located between two separate un-plated regions 40. One un-plated region 40 which is disposed to be adjacent to one side of the waveguide antenna 20 and another un-plated region 40 which is disposed to be adjacent to the other side of the waveguide antenna 20 may be formed in symmetrical shapes with respect to the waveguide antenna 20.

In the exemplary embodiments illustrated in FIGS. 3 and 4, the un-plated region 40 is formed in a rectangular plate shape extending in the front-back direction. However, the un-plated region 40 is not limited thereto and may have any appropriate shape.

Referring to FIG. 4, the width LB1 of the un-plated region 40 in the extension direction of the frame 10 may be greater than or equal to a value of dividing the wavelength of a wave passing through the waveguide antenna 20 in half.

A length LB2 of the un-plated region 40 in the extension direction of the waveguide antenna 20 (e.g. a front-back direction in FIGS. 3 and 4) may be greater than or equal to the length of the waveguide antenna 20.

The un-plated region 40 having the width LB1 in the extension direction of the frame 10, greater than or equal to a value of dividing the wavelength of a wave passing through the waveguide antenna 20 in half, and/or the length LB2 in the extension direction of the waveguide antenna 20, greater than or equal to the length of the waveguide antenna 20, as described above may prevent from deteriorating the current blocking ability of the un-plated region so that the current cannot be induced from the un-plated region to the plated region.

FIG. 5 illustrates various exemplary embodiments of the un-plated region 40.

In the exemplary embodiments illustrated in (a) to (c) of FIG. 5, the un-plated region 40 may have a plurality of convex portions (or protrusions) and a plurality of concave portions alternately arranged and formed along a direction in which the waveguide antenna 20 extends (e.g., a front-back direction in FIG. 5).

In the exemplary embodiments illustrated in (a) and (b) of FIG. 5, the un-plated region 40 and the plated region 30 have a zigzag structure. Further, in the exemplary embodiment illustrated in FIG. 5(a), the un-plated regions 40 are formed on the left and right sides of the waveguide antenna 20, respectively. On the other hand, in the exemplary embodiment illustrated in FIG. 5(b), the un-plated region 40 is formed on only one side of the waveguide antenna 20 (for example, the right side of the waveguide antenna 20 and not on the left side of the waveguide antenna 20).

In the exemplary embodiment illustrated in FIG. 5(c), the boundary line between the un-plated region 40 and the plated region 30 is formed in a wavy shape. Further, in the exemplary embodiment shown in FIG. 5(c), the un-plated region 40 is disposed on only one side of the waveguide antenna 20 (for example, the right side of the waveguide antenna 20 and not on the left side of the waveguide antenna 20).

The shapes and structures of the un-plated region 40 are not limited to those illustrated in the exemplary embodiments of FIGS. 5(a) to 5(c) and may have various shapes and structures. The shape and area of the un-plated region 40 may be structured such that a predetermined shape and area of the ground of the waveguide antenna 20 are formed to correspond to the shape and area of the plated region 30, respectively.

Therefore, by adjusting the shape and area or structure of the un-plated region 40, the size and shape of the ground may be adjusted. As a result, the effect of stabilizing the pattern and phase may be improved by adjusting the antenna pattern.

Hereinafter, the radar 1 for the vehicle according to another exemplary embodiment of the present disclosure will be described with reference to FIGS. 6 and 7.

Figure 6:
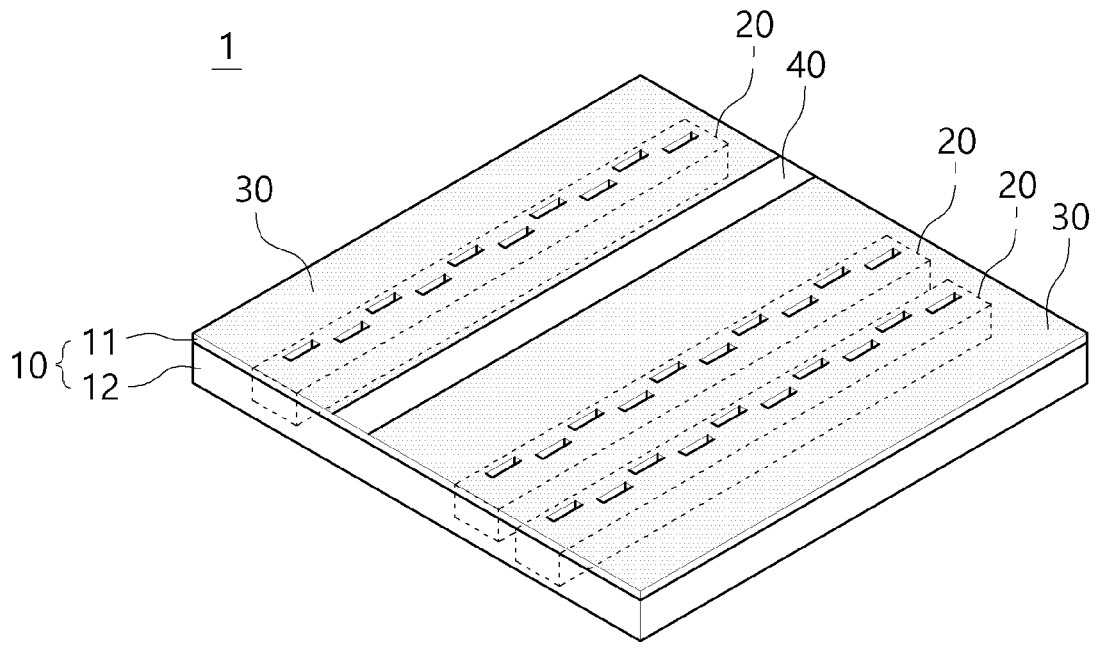
FIG. 6 is a perspective view illustrating a radar for a vehicle according to another exemplary embodiment of the present disclosure.
Figure 7:
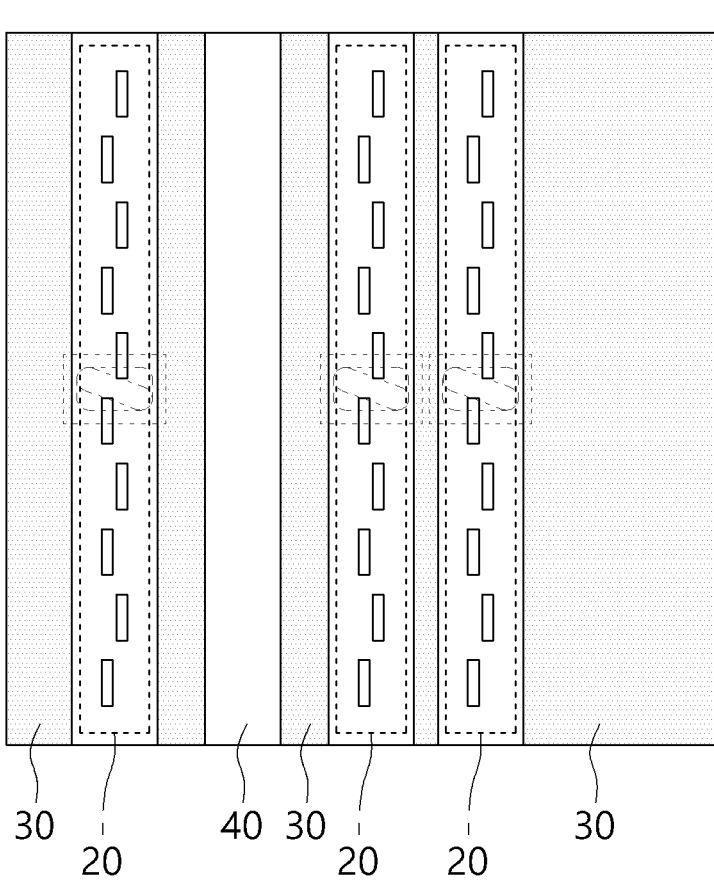
FIG. 7 is a plan view illustrating the radar of FIG. 6.

The radar 1 for the vehicle according to the exemplary embodiments of FIGS. 6 and 7 may have similar function and structure to the radar 1 for the vehicle according to the above-described exemplary embodiments. However, while the radar 1 for the vehicle according to the above-described exemplary embodiments includes one single waveguide antenna 20, the radar 1 for the vehicle 1 according to the exemplary embodiments of FIGS. 6 and 7 may comprise a plurality of waveguide antennas 20.

The radar 1 for the vehicle according to the exemplary embodiments of FIGS. 6 and 7 may include a frame 10, a plurality of waveguide antennas 20, a plated region 30 and an un-plated region 40. The frame 10 and the plated region 30 according to the exemplary embodiments of FIGS. 6 and 7 may have the same functions and structures as the frame 10 and the plated region 30 according to the above-described exemplary embodiment.

A plurality of waveguide antennas 20 according to the exemplary embodiments of FIGS. 6 and 7 are provided or embedded inside the frame 10. Since the un-plated region 40 may have various shapes and structures, various structures of a plurality of waveguide antennas 20 may be implemented.

For example, the un-plated region 40 may be formed or located between two different waveguide antennas 20. However, a position of the un-plated region 40 may be changed according to the structure of the ground required for each waveguide antenna 20.

The components of the radar 1 for the vehicle 1 have been described above in detail. Hereinafter, a change in the antenna pattern of the radar 1 for the vehicle before and after the un-plated region 40 is provided will be described with reference to FIG. 8.

Figure 8:
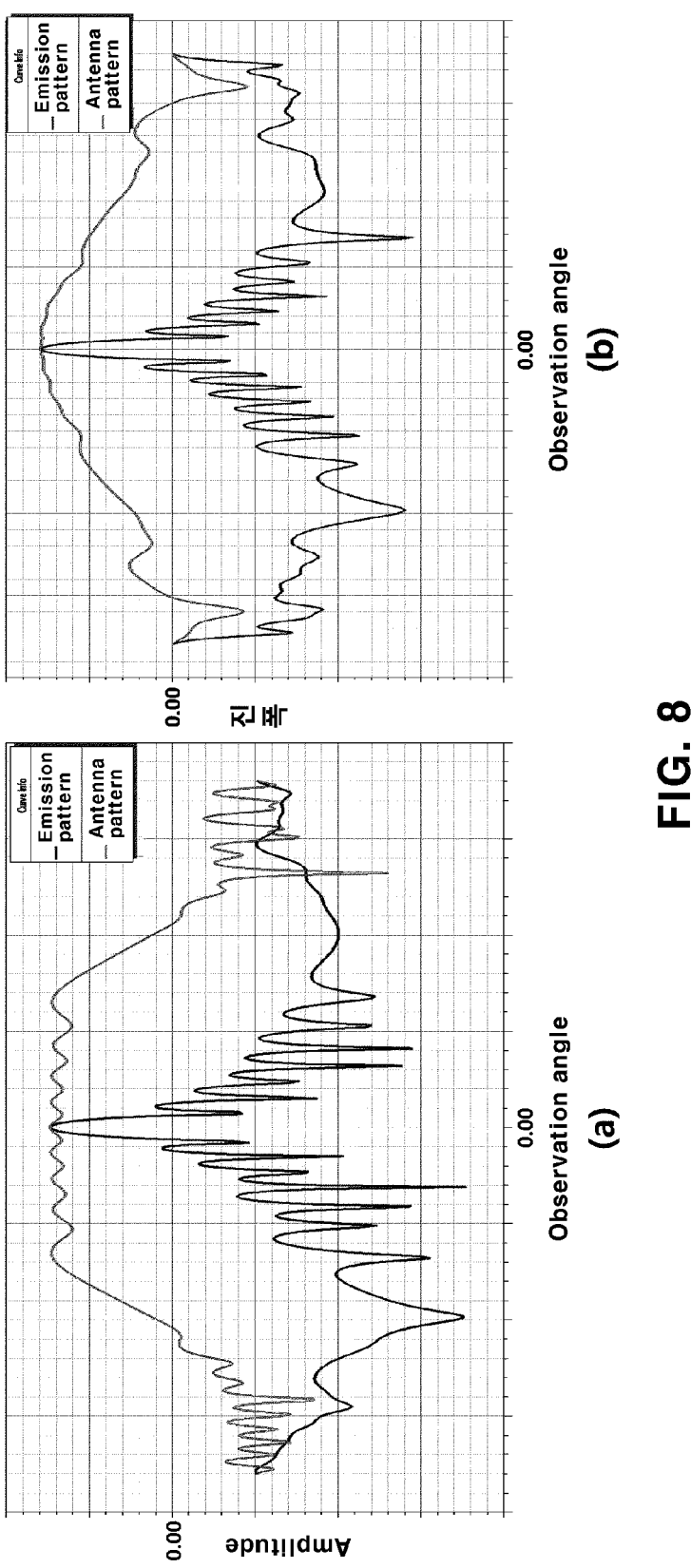
FIG. 8 is graphs showing emission patterns of antennas of a radar with an un-plated region and without an un-plated region.

FIG. 8 is a graph for illustrating a change in emission or transmission patterns of an antenna with respect to an observation angle of a radar for a vehicle. In the graphs of (a) and (b) of FIG. 8, one line means an elevation pattern among antenna emission patterns, and another line means an azimuth pattern among antenna emission patterns.

FIG. 8(a) illustrates a change in the emission or transmission patterns of the antenna of the radar 1 for the vehicle illustrated in FIGS. 1 and 2.

In the radar for the vehicle illustrated in FIGS. 1 and 2, the plated region 30 completely covers one surface of the frame 10. Accordingly, a ground is formed from the waveguide antenna 20 to both ends of the frame 10, thereby generating a surface current, and increasing variation of the antenna pattern.

FIG. 8(a) shows that the phase of the antenna pattern of the radar 1 for the vehicle illustrated in FIGS. 1 and 2 is relatively unstable.

FIG. 8(b) illustrates a change in the antenna patterns of the radars 1 for the vehicle 1 according to the exemplary embodiments of the present disclosure illustrated in FIGS. 3 to 7.

FIG. 8(b) shows that the radars 1 for the vehicle according to the exemplary embodiments of the present disclosure shown in FIGS. 3 to 7 have the beam width of the antenna pattern which is similar to that of the antenna pattern of FIG. 8(b), but the fluctuation is relatively small and the phase is relatively stable with comparison to the radar 1 for the vehicle illustrated in FIGS. 1 and 2.

This is because the plated region 30 is reduced as the un-plated region 40 is formed between the plated regions 30. The decrease in the plated region 30 can decrease the overall volume of the ground. Therefore, the antenna pattern and phase may be more stabilized.

Although the above has been described with reference to preferred exemplary embodiments of the present disclosure, the present disclosure is not limited to the configuration of the above-described exemplary embodiments.

In addition, the present disclosure may be variously modified and changed by those skilled in the art to which the present disclosure pertains without departing from the spirit and scope of the present disclosure described in the claims below.

Furthermore, the above exemplary embodiments may be configured by selectively combining all or part of each exemplary embodiment such that various modifications can be made.

EXPLANATION OF REFERENCE NUMERALS

1: Radar for vehicle
10: Frame
11: First layer
12: Second layer
20: Waveguide antenna
30: Plated region
40: Un-plated region
LB1: Un-plated region width
LB2: Un-plated region length

What is claimed is:

1. A radar for a vehicle, comprising:
at least one waveguide antenna;
a frame in which the waveguide antenna is embedded;
a plated region including a metallic material and covering at least an outer peripheral portion of one surface of the frame; and
at least one un-plated region where no metallic material is disposed on the one surface of the frame, wherein the un-plated region is located to be adjacent to the waveguide antenna,
wherein the un-plated region is configured to reduce volume or size of the ground by the plated region.

2. The radar of claim 1, wherein a shape of the un-plated region and an area where the un-plated region is located are configured to be ground for the waveguide antenna.

3. The radar of claim 1, wherein a length of the un-plated region is greater than or equal to a length of the waveguide antenna.

4. The radar of claim 3, wherein a width of the un-plated region is greater than or equal to a value of dividing a wavelength of a wave passing through the waveguide antenna in half.

5. The radar of claim 1, wherein the at least one un-plated region comprises a plurality of the un-plated regions that are spaced apart from each other on the one surface of the frame.

6. The radar of claim 5, wherein the waveguide antenna is located between two of the plurality of the un-plated regions.

7. The radar of claim 6, wherein one of the plurality of the un-plated regions which is disposed to be adjacent to one side of the waveguide antenna and another of the plurality of the un-plated regions which is disposed to be adjacent to another side of the waveguide antenna have a shape symmetrical to each other with respect to the waveguide antenna.

8. The radar of claim 5, wherein each of the plurality of un-plated regions has one or more slots and the plurality of un-plated regions are arranged side by side in a direction substantially parallel to the waveguide antenna.

9. The radar of claim 1, wherein the at least one waveguide antenna comprises a plurality of the waveguide antennas embedded in the frame.

10. The radar of claim 9, wherein the un-plated region is located between two of the plurality of the waveguide antennas.

11. The radar of claim 1, wherein the un-plated region has a plurality of convex portions and a plurality of concave portions which are arranged to be alternate to each other.

12. The radar of claim 1, wherein the waveguide antenna comprises a slot antenna.

13. The radar of claim 1, wherein the waveguide antenna comprises a horn antenna.

14. The radar of claim 1, wherein an operating frequency of the waveguide antenna is between 76 GHz and 81 GHz.

15. A vehicle, comprising:
a radar configured to transmit an electromagnetic wave signal and receive a reflected electromagnetic wave signal; and
a processor configured to generate information associated with surrounding of the vehicle based on the reflected electromagnetic wave signal received by the radar,
wherein the radar comprises:
a waveguide antenna;
a frame in which the waveguide antenna is embedded;
a plated region including a metallic material and covering at least an outer peripheral portion of one surface of the frame; and
at least one un-plated region where no metallic material is disposed on the one surface of the frame, wherein the un-plated region is located to be adjacent to the waveguide antenna,
wherein the un-plated region is configured to reduce volume or size of the ground by the plated region.

16. The vehicle of claim 15, wherein a width of the un-plated region is greater than or equal to a value of dividing a wavelength of a wave passing through the waveguide antenna in half.

17. The vehicle of claim 15, wherein the processor is configured to maintain a constant driving speed of the vehicle based on the information associated with the surrounding of the vehicle.

18. The vehicle of claim 15, wherein the processor is configured to adjust a driving speed of the vehicle such that a distance between the vehicle and a preceding vehicle is greater than a preset reference distance, based on the information associated with the surrounding of the vehicle.

19. The vehicle of claim 15, wherein the controller is configured to adjust a driving direction of the vehicle based on the information associated with the surrounding of the vehicle, when a breakdown of the vehicle occurs.

* * * * *